United States Patent
Gunther et al.

(10) Patent No.: US 12,099,394 B2
(45) Date of Patent: Sep. 24, 2024

(54) PRESERVING A DECOUPLING CAPACITOR'S CHARGE DURING LOW POWER OPERATION OF A LOGIC CIRCUIT

(71) Applicant: NXP B.V., Eindhoven (NL)

(72) Inventors: Andre Gunther, San Jose, CA (US); Jeffrey Alan Goswick, San Jose, CA (US); Rob Cosaro, San Jose, CA (US)

(73) Assignee: NXP B.V., Eindhoven (NL)

( * ) Notice: Subject to any disclaimer, the term of this patent is extended or adjusted under 35 U.S.C. 154(b) by 205 days.

(21) Appl. No.: 17/805,652

(22) Filed: Jun. 6, 2022

(65) Prior Publication Data
US 2023/0393639 A1    Dec. 7, 2023

(51) Int. Cl.
*G06F 1/32*       (2019.01)
*G06F 1/3212*     (2019.01)
*G06F 1/3296*     (2019.01)

(52) U.S. Cl.
CPC .......... *G06F 1/3212* (2013.01); *G06F 1/3296* (2013.01)

(58) Field of Classification Search
CPC .............................. G06F 1/3212; G06F 1/3296
See application file for complete search history.

(56) References Cited

U.S. PATENT DOCUMENTS

| | | |
|---|---|---|
| 9,618,956 B2 | 4/2017 | Gill et al. |
| 9,871,506 B2 | 1/2018 | Coutts et al. |
| 10,656,665 B2 | 5/2020 | Pelicia et al. |
| 2007/0014177 A1* | 1/2007 | Jeong ..................... G11C 5/143 365/226 |
| 2019/0384339 A1* | 12/2019 | Pelicia ..................... G05F 1/56 |

OTHER PUBLICATIONS

Wikipedia, System on chip, retrieved from the internet at <https://web.archive.org/web/20211218120650/https://en.wikipedia.org/wiki/System_on_a_chip> (Year: 2021).*
Kester at al., Switched Capacitor Voltage Converters, retrieved from the internet at <https://www.analog.com/media/en/training-seminars/design-handbooks/Practical-Design-Techniques-Power-Thermal/Section4.pdf> (Year: 2020).*
Electronics Projects Focus, Different DC to DC Voltage Conversion Methods, retrieved from the internet at <https://www.elprocus.com/different-types-dc-to-dc-converters/> (Year: 2020).*
Wikipedia, Three-state logic, retrieved from the internet at <https://web.archive.org/web/20201204190750/https://en.wikipedia.org/wiki/Three-state_logic> (Year: 2020).*

* cited by examiner

*Primary Examiner* — Stefan Stoynov

(57) ABSTRACT

Systems and methods for preserving a decoupling capacitor's charge during low power operation of a logic circuit. An electronic circuit may include: a main voltage regulator coupled to a supply voltage terminal and configured to apply a first regulated voltage across a capacitor coupled in parallel with a logic circuit; a low power regulator coupled to the supply voltage terminal and configured to apply a second regulated voltage across the logic circuit; and a control circuit coupled to the low power regulator. The control circuit may be configured to: during a first mode of operation, allow the main voltage regulator to apply the first regulated voltage to the logic circuit, and, during a second mode of operation, allow the low power regulator to apply the second regulated voltage to the logic circuit and decouple the capacitor from the logic circuit while the low power regulator applies the second regulator voltage.

17 Claims, 7 Drawing Sheets

PRESERVING A DECOUPLING CAPACITOR'S CHARGE DURING LOW POWER OPERATION OF A LOGIC CIRCUIT

FIELD

This disclosure relates generally to electronic circuits, and more specifically, to systems and methods for preserving a decoupling capacitor's charge during low power operation of a logic circuit.

BACKGROUND

Today's microcontrollers and System-on-Chips (SoCs) are found in a multitude of battery-operated devices, such as phones, tablets, laptops, and wearables. As the complexity of these devices increases, their power consumption becomes a serious concern.

Modern SoCs are designed to operate in low power modes to extend battery life. In many cases, an SoC may use a power management mechanism, such as Dynamic Voltage and Frequency Scaling (DVFS), to preserve energy when the SoC is operating in a low power mode that does not demand its maximum performance.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

In a System-on-Chip (SoC), high supply voltages produce high gate overdrive which yields larger currents usable to charge and discharge internal circuit capacitances, thus resulting in greater speeds. Because the power consumption of a logic circuit is particularly sensitive to the magnitude of its supply voltage ($P \sim V^2$), however, in order to preserve a device's battery life, an SoC's supply voltage should be kept as low as possible, sufficient only to obtain the necessary speed required for its logic circuits to operate in a desired mode.

Leakage currents are also a function of an SoC's supply voltage. In certain operating modes, this leakage dependency can be exponential. At least for this additional reason, it would be beneficial to lower the supply voltage of an SoC to the lowest possible value when the SoC operates in a low power mode (e.g., state retention of latches, memory retention, etc.).

Dynamic Voltage and Frequency Scaling (DVFS) has been widely accepted in the industry as a mechanism for lowering the overall power consumption of an SoC and to save power in operating modes that do not require the SoC's maximum performance. Often overlooked in DVFS, however, is the effect of mode transition between lower voltage (or standby) and higher voltage operations. Not only must one wait for the power supply to reach the value required for an SoC's logic circuit to operate at its desired speed—and thus lose energy due to the time it takes to reach that value in the first place, but the energy required to charge and discharge decoupling capacitances that provide stiffness to that power supply may also lead to additional losses.

Due to technology scaling and increased integration density, modern circuits have more aggressive transient currents than ever before, despite having lower power supply voltage needs. As a result, today's power converters are designed to regulate to a tighter absolute voltage (due to a lower voltage requirement) while delivering more current, faster. In order to meet these specifications, larger decoupling capacitors may be used to absorb fast current spikes from the logic and give the voltage regulator enough time to react. Yet larger decoupling capacitors hold more charge, therefore requiring more energy to charge and discharge to different voltage levels.

Figure 1A:
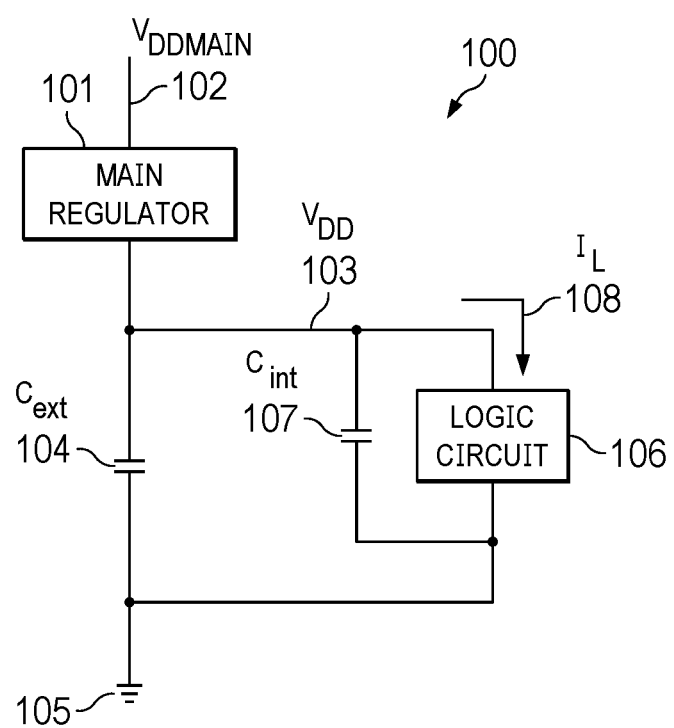
FIGS. 1A-C show a block diagram and accompanying graphs explaining the operation a conventional Dynamic Voltage and Frequency Scaling (DVFS) system in an SoC ("Prior Art").
Figure 1B:
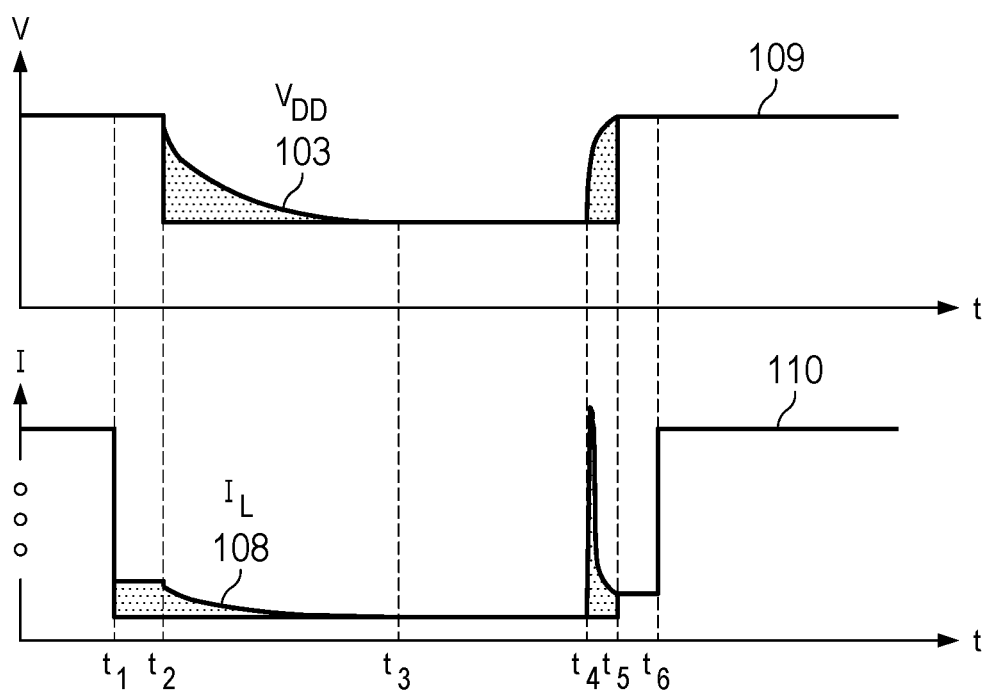
Figure 1C:
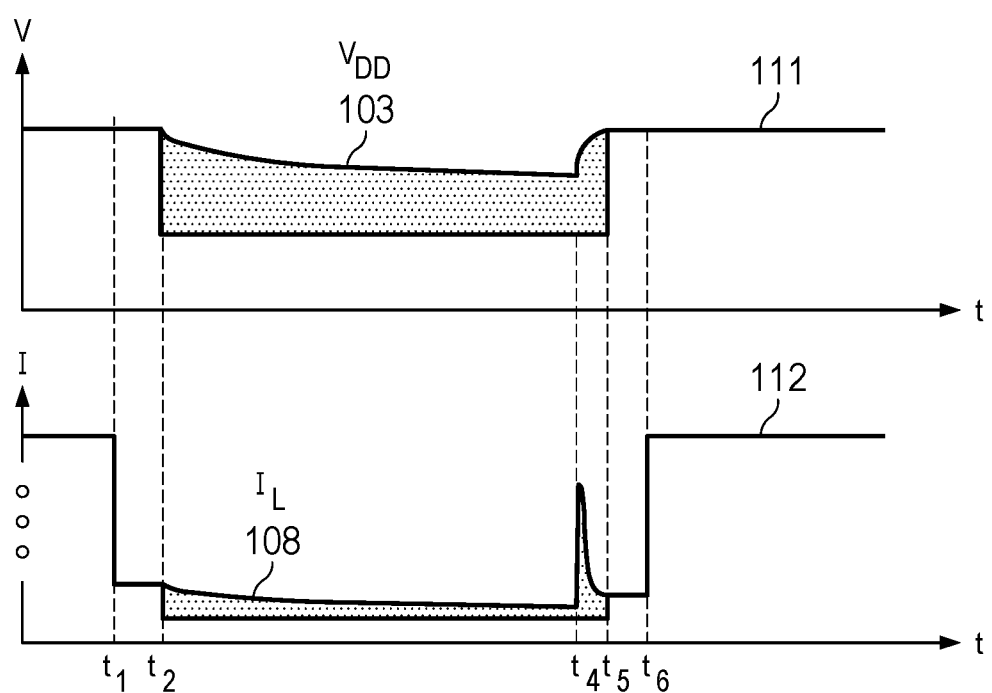

To illustrate these challenges, FIGS. 1A-C show a block diagram and accompanying graphs explaining the operation conventional DVFS system 100 in an SoC ("Prior Art"). Particularly, the SoC of FIG. 1A includes voltage regulator 101 coupled to supply voltage terminal ($V_{DDMAIN}$) 102 and configured to output regulated voltage ($V_{DD}$) 103 across external decoupling capacitor ($C_{ext}$) 104, which is coupled to ground terminal 105. External capacitor $C_{ext}$ 104 is coupled in parallel with logic circuit 106 and internal capacitances ($C_{int}$) 107. In operation, logic circuit 106 draws electrical current ($I_L$) 108 provided by voltage regulator 101.

FIG. 1B shows supply voltage curve 109 with values of $V_{DD}$ 103 over time, and load current curve 110 with values of $I_L$ 108 over time, for a long retention period—i.e., a long period of low voltage and low current. At $t_1$, $I_L$ 108 flowing into logic circuit 106 and $C_{int}$ 107 drops, as logic circuit 106 is put into state retention mode. Supply voltage $V_{DD}$ 103 is still at its initial level. At $t_2$, voltage regulator 101 (which can be implemented on or off the SoC) receives a command to reduce the value of $V_{DD}$ 103.

Curves 109 and 110 are based upon the assumption that voltage regulator 101 does not actively discharge the load capacitance, but instead relies on the load itself to do so, in order to save power. The interval between $t_1$ and $t_2$ should be minimized (close to zero), but to guarantee the proper operation of logic circuit 106, one must ensure that logic circuit 106 is already in a state retention mode. Ideally, the supply voltage should be at a low value right after $t_1$, but because in practice this time is greater than zero, $I_L$ 108 is higher than it needs to be (due to its voltage dependency).

After $t_2$, supply voltage $V_{DD}$ 103 starts to decay as discharged by $I_L$ 108. Here one many assume that $I_L$ 108 contains the currents through internal capacitance $C_{int}$ 107 without loss of generality. Due to the large capacitance and the very small currents (especially in retention), the decay rate of $V_{DD}$ 103 is very slow. During this time, $V_{DD}$ 103 is larger than it needs to be to simply maintain retention, thus incurring a double penalty by also increasing $I_L$ 108 until $t_3$.

At $t_3$, $V_{DD}$ 103 has finally reached the minimum voltage that logic circuit 106 requires to operate in its retention-only state. Voltage regulator 101 supplies $I_L$ 108 and thus prevents decoupling capacitor $C_{ext}$ 104 from being discharged any further. Between $t_3$ and $t_4$, no power is wasted.

At $t_4$, voltage regulator 101 receives a signal to increase $V_{DD}$ 103 to a level needed to wake up logic circuit 106 from state retention mode, and to perform a requested read or write operation in active mode. However, it takes time to charge up $C_{ext}$ 104 and $C_{int}$ 107. It should be noted that $I_L$ 108 as illustrated does not include the current into the $C_{ext}$ 104, but the spike observed is due to the charging up of $C_{int}$ 107. A large amount of current is required to charge $C_{ext}$ 104 back up. Until $V_{DD}$ 103 reaches its final state at $t_5$, the SoC's processing core (not shown) cannot wake up and remains in sleep mode. At $t_6$ the core receives a signal to wake up. The interval between $t_5$ and $t_6$ should also be minimized.

In many applications, an SoC's sleep time is much shorter than shown in FIG. 1B. This can be the case if the SoC wakes up multiple times per second (e.g., in wearable devices), as shown in FIG. 1C. In these cases, as illustrated by supply voltage curve 111 and load current curve 112, $V_{DD}$ 103 never effectively discharges to the minimum supply voltage required for state retention, and the SoC receives the wake-up signal before $t_3$ is reached. This means that the SoC does not reach its lowest possible power state and the device's target power consumption is not achieved.

Figure 2:
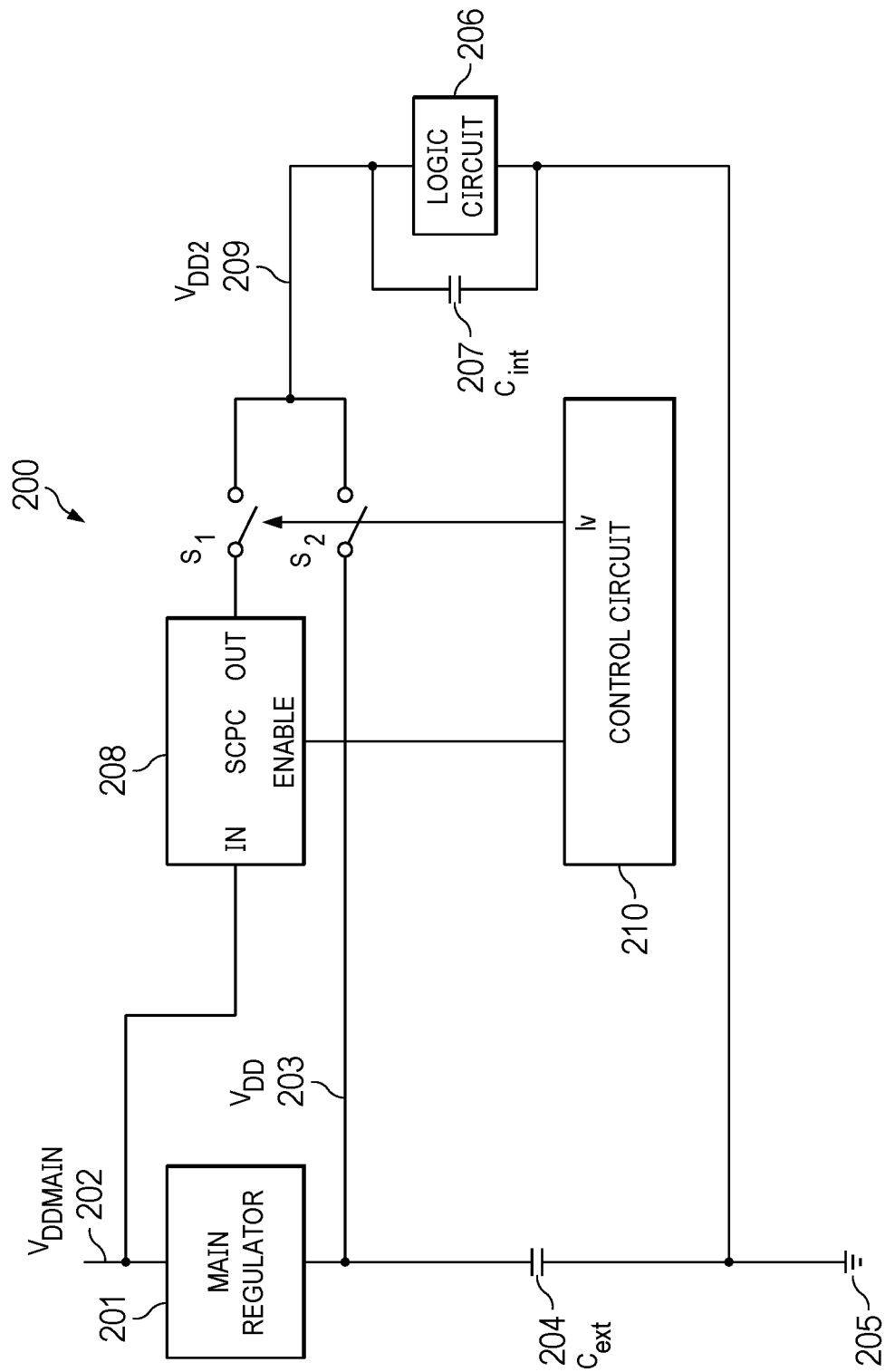
FIG. 2 is a block diagram of a first example of a DVFS system configured to preserve a decoupling capacitor's charge during low power operation of a logic circuit in an SoC, according to some embodiments.

FIG. 2 is a block diagram of first example 200 of a DVFS system configured to preserve a decoupling capacitor's charge during low power operation of a logic circuit in an SoC, according to some embodiments. As illustrated, example 200 includes main voltage regulator 201 coupled to supply voltage terminal ($V_{DDMAIN}$) 202 and configured to output regulated voltage ($V_{DD}$) 203 across external decoupling capacitor ($C_{ext}$) 204, which is coupled to ground terminal 205. Capacitor $C_{ext}$ 204 is coupled in parallel with logic circuit 206 and internal capacitances (Cant) 207 via switch S2.

Second, low power voltage regulator 208 is coupled to $V_{DDMAIN}$ 202, and to logic circuit 206 via bypass switch $S_1$. Control circuit 210 is configured to selectively provide the enable signal to low power voltage regulator 208 and to control the state of bypass switch $S_1$, for example, as logic circuit 206 enters or leaves a low power mode of operation (e.g., memory retention).

In operation, low power regulator 208 may be enabled when the enable signal is in a first state and disabled when the enable signal is in a second state. For example, when low power voltage regulator 208 receives an enable signal and $S_1$ is closed, low power voltage regulator 208 is configured to output second regulated voltage ($V_{DD2}$) 209 to logic circuit 206. As such, main voltage regulator 201 may be configured to regulate voltage $V_{DD}$ 203 when logic circuit 206 is at an active, normal, or read/write operating mode, and low power voltage regulator 208 may be configured to regulate $V_{DD2}$ 209 as a retention voltage when logic circuit 206 is in a low power mode. Moreover, while low power regulator 208 applies the second regulator voltage, capacitor $C_{ext}$ 204 is decoupled from logic circuit 206 through $S_2$.

Unlike bypass switch $S_2$, switch $S_1$ may not always be explicitly implemented, yet it shown here to illustrate the power multiplexing mechanism of example 200. Instead of using switch $S_1$, in practical implementations second voltage regulator 208 may be designed to tristate its output into a high impedance state, or to otherwise have its output electrically isolated from logic circuit 206, when disabled (e.g., when control circuit 210 de-asserts its enabling signal).

In some embodiments, low power voltage regulator 208, control circuit 210, and logic circuit 206 may all be implemented in a single integrated circuit (IC), and such an IC may be integrated in an SoC. In other embodiments, main voltage regulator 201 may be also integrated within the SoC. Moreover, logic circuit 206 may include a memory circuit such as, for example, a Random-Access Memory (RAM) or static RAM (SRAM).

Main voltage regulator 201 may be any suitable type of voltage regulator such as a buck converter, low drop-out (LDO) regulator, linear regulator, or the like. External capacitor $C_{ext}$ 204 may be any type of capacitor formed from any suitable materials and structures. It is generally located external to the IC and may be used for filtering, regulator stability, or suppression of high load transient currents, for example.

Control circuit 210 may be part of a power management unit of the SoC, for example, and it may directly and/or indirectly communicate with a processor on that SoC. Control circuit 210 is configured to generate an enable signal that is indicative of one or more modes of operation of logic circuit 206. For example, a first state of the enable signal may be indicative of a normal or active mode, and a second state of enable signal may be indicative of a low power mode.

In some embodiments, an enable signal may include multiple modes and may correspond to multiple operating and low power modes. A low power mode may correspond to a retention mode where the voltage supplied to a logic circuit 206 is lowered to a minimum voltage value by which its storage elements (e.g., flip-flops, latches, RAM cells) retain their values. In some embodiments, logic circuit 206 may be formed as a sea of gates (SoG) or a portion of the SoG including synthesized and place and routed random logic and memory circuits, for example.

In various embodiments, low power voltage regulator 208 may be implemented as a Switched Capacitor Power Converter (SCPC) or an ultra-low power DC-to-DC converter. In an ideal SCPC, the input power and the output power are equal (neglecting the non-ideal efficiency to ease explanation). This means that SCPC 208 does not suffer from using large input voltage the same way as an LDO does, as the input power is solely determined by output power and therefore larger input voltage will result in smaller input current—which allows SCPC 208 to be connected to $V_{DDMAIN}$ 202. This implementation is particularly advantageous when main voltage regulator 201 is an LDO, as circuit 200 does not incur a voltage penalty during retention. Furthermore, this implementation preserves the charge on $C_{ext}$ 204 as retention power does not discharge this capacitor.

Once the SoC needs to wake-up, circuit 200 can immediately switch $V_{DD2}$ 209 back to $V_{DD}$ 203, thus achieving faster wake-up and therefore saving power that would otherwise be wasted waiting for the indication that our external voltage had ramped up sufficiently. Additionally, having the low retention voltage $V_{DD2}$ 209 available immediately prevents power being wasted during the discharge.

The implementation of low power voltage regulator 208 in circuit 200 is more suitable for SCPCs, since switching regulators are much more efficient than linear regulators when translating large voltage differences. Nevertheless, in some cases, an ultra-low power LDO might may be employed as regulator 208 and still result in some power savings.

Figure 3:
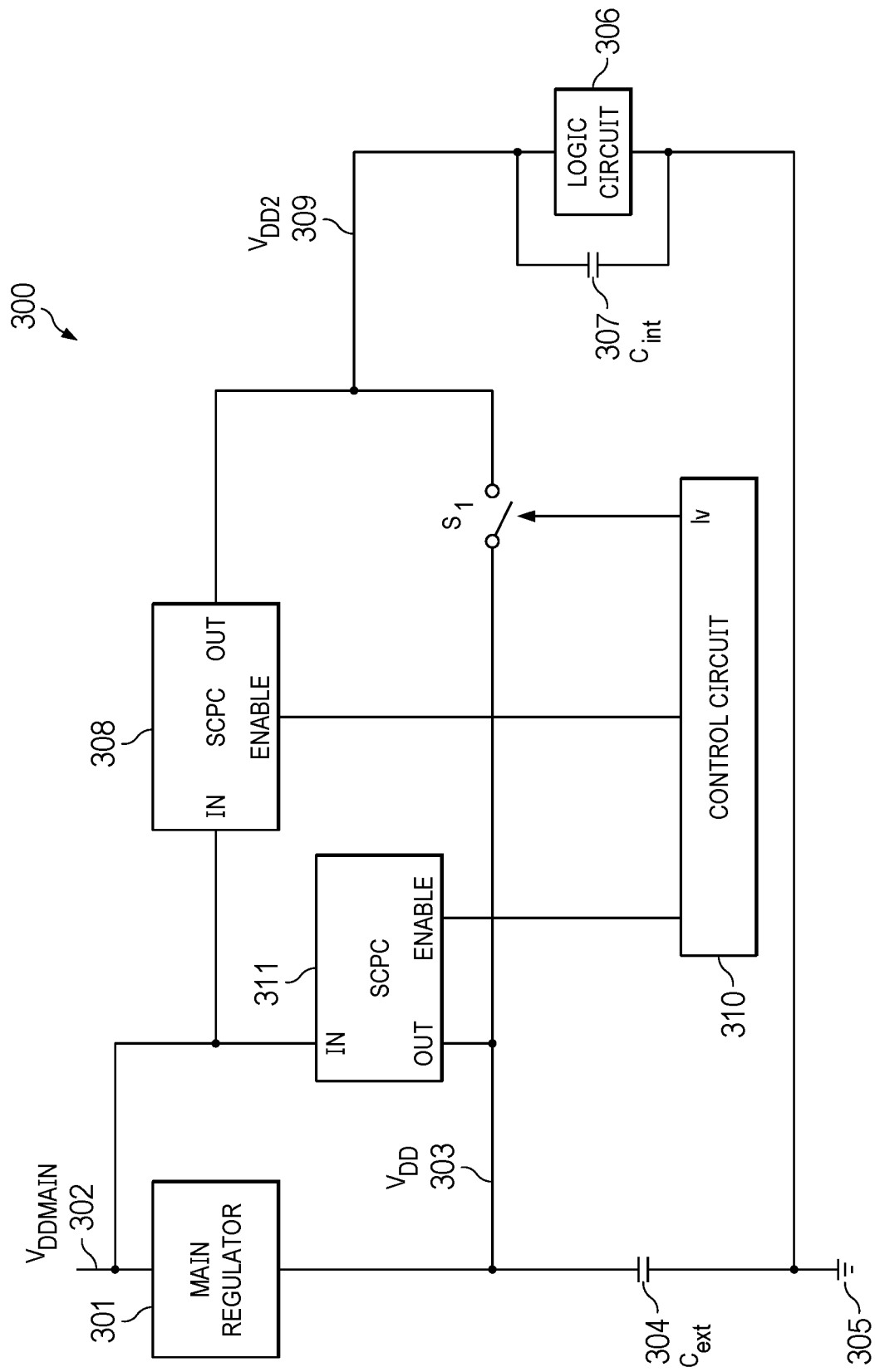
FIG. 3 is a block diagram of a second example of a DVFS system configured to preserve a decoupling capacitor's charge during low power operation of a logic circuit in an SoC, according to some embodiments.

FIG. 3 is a block diagram of second example 300 of a DVFS system configured to preserve a decoupling capacitor's charge during low power operation of a logic circuit in an SoC, according to some embodiments. Example 300 includes main voltage regulator 301 coupled to supply voltage terminal ($V_{DDMAIN}$) 302 and configured to output regulated voltage ($V_{DD}$) 303 across external decoupling capacitor ($C_{ext}$) 304, which is coupled to ground terminal 305. Capacitor $C_{ext}$ 304 is coupled in parallel with logic circuit 306 and internal capacitances ($C_{int}$) 307.

Second, low power voltage regulator 308 is coupled to $V_{DDMAIN}$ 302 and configured to output $V_{DD2}$ 309 to logic circuit 206. To fully maintain the charge on $C_{ext}$ 304 by compensating for the self-discharge leakage, main regulator leakage, and the bypass switch $S_1$ leakage, a third voltage regulator 311 is coupled to $V_{DDMAIN}$ 302 and to $V_{DD}$ 303. Control circuit 210 is configured to selectively provide enable signals to second voltage regulator 208 and third voltage regulator 311, and to control the state of bypass switch $S_1$, for example, as logic circuit 206 enters or leaves its low power mode of operation (e.g., memory retention only).

In operation, third voltage regulator 311 may compensate for leakage currents and maintain $V_{DD}$ 303 across $C_{ext}$ 304. Since $C_{ext}$ 304 is large and the leakage currents are very small, an ultra-low power SCPC may be employed as third voltage regulator 311 with essentially zero power consumption.

Figure 4:
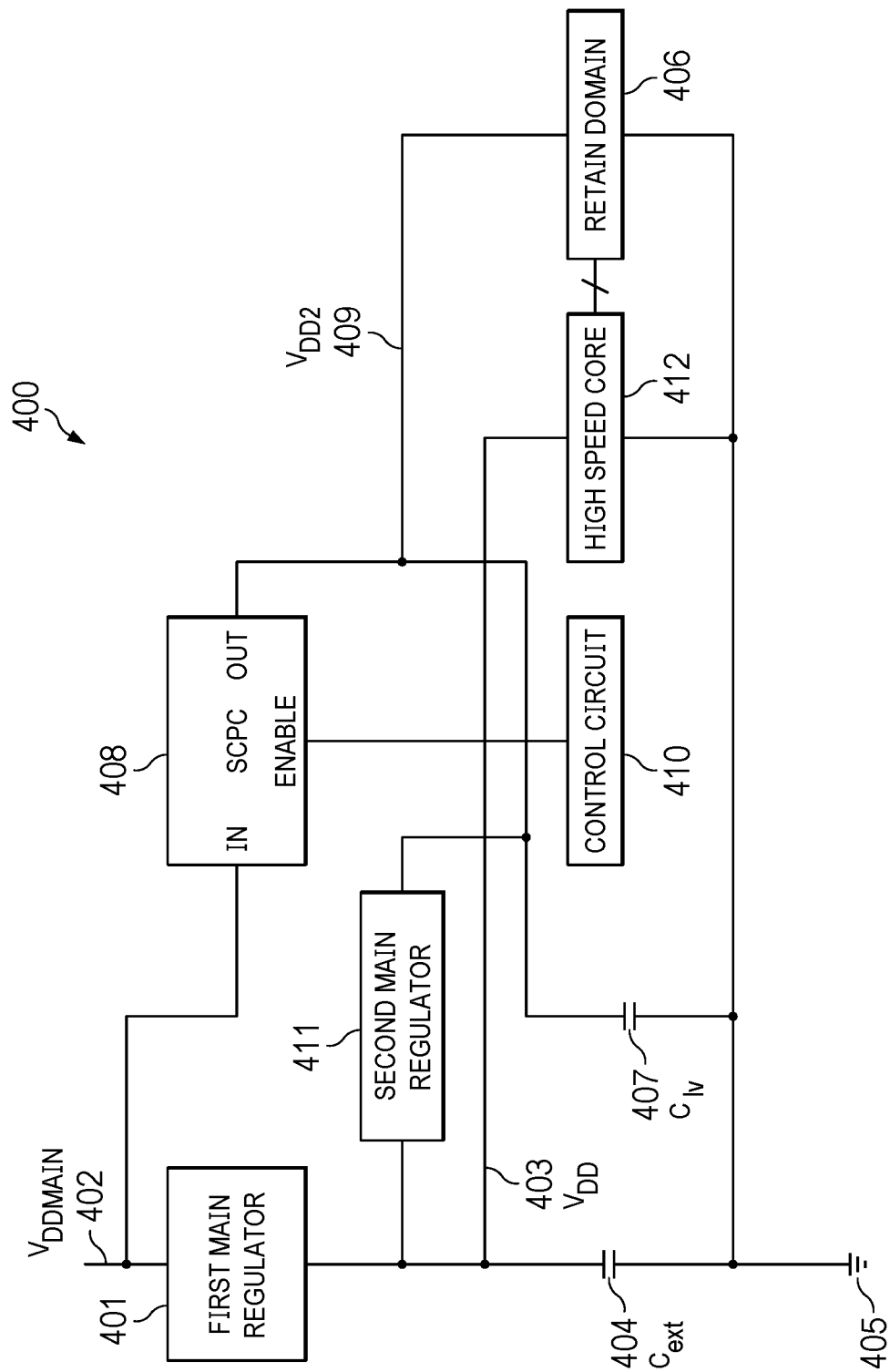
FIG. 4 is a block diagram of a third example of a DVFS system configured to preserve a decoupling capacitor's charge during low power operation of a logic circuit in an SoC, according to some embodiments.

FIG. 4 is a block diagram of a third example 400 of a DVFS system configured to preserve a decoupling capacitor's charge during low power operation of a logic circuit in an SoC, according to some embodiments. Example 400 includes first main voltage regulator 401 and second main voltage regulator 411. First voltage regulator 401 is coupled to supply voltage terminal ($V_{DDMAIN}$) 402 and configured to output regulated voltage ($V_{DD}$) 403 across external decoupling capacitor ($C_{ext}$) 404, which is coupled to ground terminal 405. Capacitor $C_{ext}$ 404 is coupled in parallel with high-speed core 412.

Low-power voltage regulator 408 is coupled to $V_{DDMAIN}$ 402 and to logic circuit 410, and it is configured to output $V_{DD2}$ 409 to retain domain 406 coupled to high-speed core 412. The input of second main voltage regulator 411 is coupled to $V_{DD}$ 403, whereas the output of second main voltage regulator 411 is coupled to $V_{DD2}$ 409 and to second external capacitor ($C_{lv}$) 407. Control circuit 410 is configured to provide an enable signal to low-power voltage regulator 408 when retain domain 406 is operating in retention-only mode.

Often, multiple on-chip supply voltages are used in order to finely tune the minimum supply voltage to the requirements for each logic domain of an SoC. In some cases, first and second main voltage regulators 401 and 411 may be DC-DC converters, and low-power voltage regulator 408 may be employed to generate a second, lower supply voltage for low power logic and/or SRAM 406. Usually, the SRAM to be retained is in the low voltage domain of VDD2 409. This allows the SoC to disable first main voltage regulator 401 and to enable low-power voltage regulator 408, which then supplies this domain from an SCPC, as previously discussed. In other implementations, additional low-power voltage regulators may be used to supply each distinct low-power domain.

Second main regulator 411 may require the use of second external capacitor ($C_{lv}$) 407 (low voltage domain cap). In some cases, the presence of second external capacitor $C_{lv}$ 407 may reduce the power consumption of circuit 400.

Particularly, low-power voltage regulator 408 may supply the leakage currents, and it may be turned off periodically, only turning it on to replenish the charge that was drawn over time due to such leakage currents. Additionally, $C_{lv}$ 407 may be made smaller than $C_{ext}$ 404, where the charge should be maintained, due to the lower current from the lower speed logic on this domain.

Figure 5:
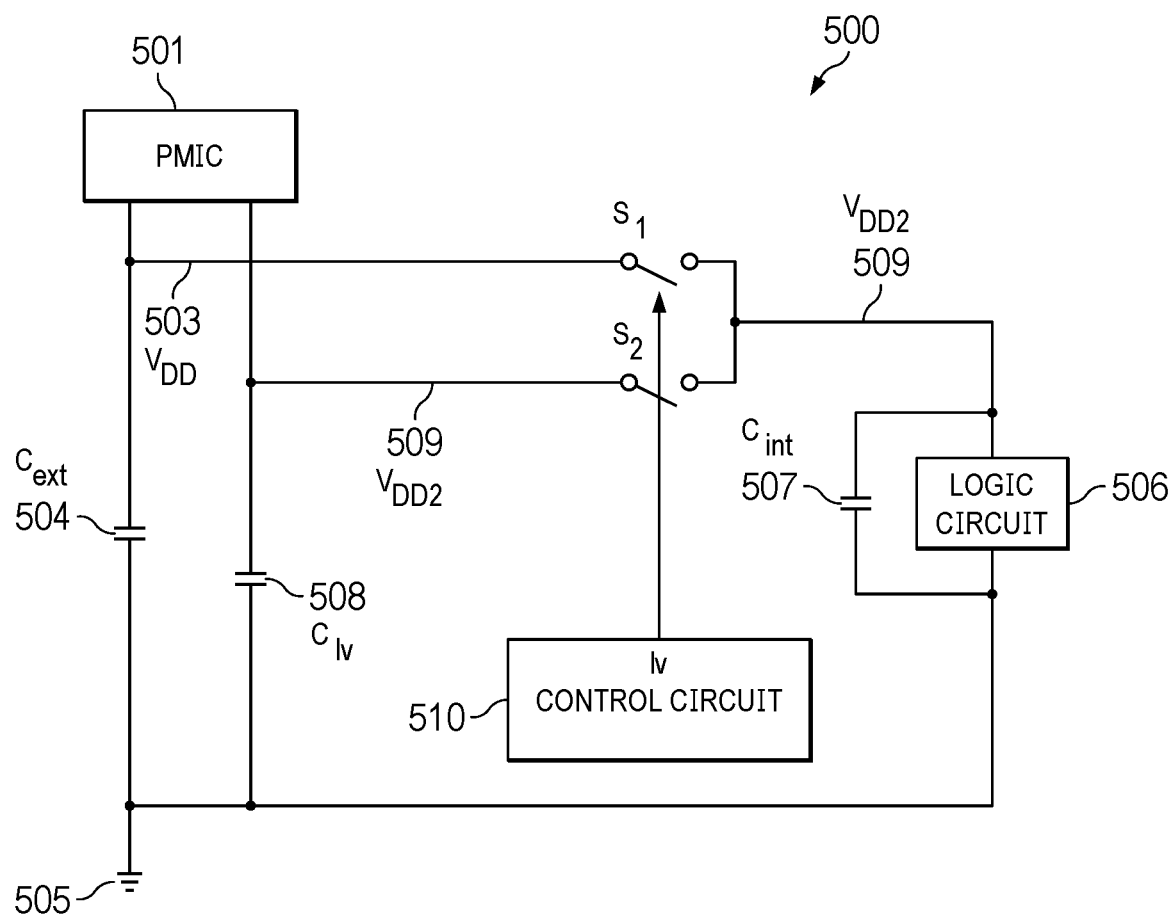
FIG. 5 is a block diagram of a fourth example of a DVFS system configured to preserve a decoupling capacitor's charge during low power operation of a logic circuit in an SoC, according to some embodiments.

FIG. 5 is a block diagram of a fourth example 500 of a DVFS system configured to preserve a decoupling capacitor's charge during low power operation of a logic circuit in an SoC, according to some embodiments. In example 500, Power Management Integrated Circuit (PMIC) 501 is configured to apply first regulated voltage $V_{DD}$ 503 to across first external capacitor ($C_{ext}$) 504, and second regulated voltage $V_{DD2}$ 509 to second external capacitor ($C_{lv}$) 508.

In operation, PMIC 501 may supply two separate external supply voltages for active mode ($V_{DD}$ 503) and for retention mode ($V_{DD2}$ 509) to the SoC. Control circuit 510 selects between these two voltages on chip, using a power multiplexer that includes switches 51 and $S_2$.

As such, systems and methods described herein may enable scaling a supply voltage in an SoC or microprocessor during low power operation without discharging the large decoupling capacitor, thus reducing the overall energy spent entering and exiting low power modes and making fast toggling between low power and full power much more power efficient. In various implementations, these systems and methods may provide a low power system SoC solution for wearables and other applications where retention modes are prevalent.

Almost all types of digital processors (e.g., application processors, microcontrollers, digital signal processors or "DSPs" specialty processors, etc.) can operate in power saving modes that turn off major parts of the circuit in order to lower power consumption while offering features that previously required extra low power chips. In some cases, by observing the voltage across an SoC's external capacitors, one may conclude that their charge is preserved based upon the transient currents on the main supply, which in turn may lead to the conclusion that a switched capacitor circuit, such as described in examples 200-500, is generating the internal voltages.

In an illustrative, non-limiting embodiment, an electronic circuit may include: a main voltage regulator coupled to a supply voltage terminal and configured to apply a first regulated voltage across a capacitor coupled in parallel with a logic circuit; a low power regulator coupled to the supply voltage terminal and configured to apply a second regulated voltage across the logic circuit; and a control circuit coupled to the low power regulator. The control circuit may be configured to: during a first mode of operation, allow the main voltage regulator to apply the first regulated voltage to the logic circuit, and, during a second mode of operation, allow the low power regulator to apply the second regulated voltage to the logic circuit and decouple the capacitor from the logic circuit.

In various implementations, the logic circuit may include a memory. The memory and the control circuit may be part of an SoC. In some cases, the first mode of operation may include an active mode, and the second power mode of operation may include a retention mode.

The main voltage regulator may include a linear voltage regulator. Conversely, the low power regulator may include an SCPC. Additionally, or alternatively, the low power regulator may include a DC-to-DC converter. Additionally, or alternatively, the low power regulator may include an LDO regulator. An output of the low power regulator may be in a high impedance state during the first mode of operation.

To allow the voltage regulator to apply the first regulated voltage to the logic circuit, the control circuit may be configured to disable the low power regulator and to close a bypass switch between an output of the main voltage regulator and the logic circuit. Additionally, or alternatively, to allow the low power regulator to apply the second regulated voltage to the logic circuit, the control circuit may be configured to enable the low power regulator and to open the bypass switch between the output of the main voltage regulator and the logic circuit.

The electronic circuit may include another low power regulator coupled to the supply voltage terminal and configured to apply a third regulated voltage across the capacitor, where the third regulated voltage may be selected to compensate for leakages of the capacitor, the main voltage regulator, and the bypass switch between the output of the main voltage regulator and the logic circuit. The electronic circuit may also include another low power regulator coupled to the supply voltage terminal and configured to apply a third regulated voltage across another logic circuit, where the logic circuit and the other logic circuit may be in different power domains. The electronic circuit may further include another main voltage regulator coupled to an output of the main voltage regulator and to a second capacitor coupled in parallel with the logic circuit.

In another illustrative, non-limiting embodiment, a method may include: in connection with a memory entering a retention mode, enabling a switching regulator and opening a bypass switch, where the switching regulator receives a supply voltage coupled to a main regulator, where the main regulator applies a first regulated voltage across a capacitor coupled in parallel with the memory when the bypass switch is closed, where the capacitor is decoupled from the memory when the bypass switch is open, and where the switching regulator applies a second regulated voltage to the memory when the bypass switch is open; and in connection with the memory leaving the retention mode, closing the bypass switch.

For example, the switching regulator may include an SCPC. The method may also include maintaining an output of the switching regulator in a high impedance state after the memory leaves the retention mode.

In another illustrative, non-limiting embodiment, an electronic device may include a PMIC configured to apply a first regulated voltage to a first capacitor and a second regulated voltage to a second capacitor; a memory circuit coupled in parallel with the first capacitor via a first switch and to the second capacitor via a second switch; and a control circuit configured to: (a) close the first switch and open the second switch when the memory circuit operates in active mode; and (b) open the first switch and close the second switch when the memory circuit operates in retention mode.

The first capacitor and the first regulated voltage may be larger than the second capacitor and the second regulated voltage. Moreover, the memory circuit and the control circuit may be part of an SoC coupled to the PMIC.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An electronic circuit, comprising:
   a main voltage regulator coupled to a supply voltage terminal and configured to apply a first regulated voltage across a capacitor coupled in parallel with a logic circuit;
   a low power regulator coupled to the supply voltage terminal and configured to apply a second regulated voltage across the logic circuit;
   a control circuit coupled to the low power regulator, wherein the control circuit is configured to: (a) during a first mode of operation of the logic circuit, allow the main voltage regulator to apply the first regulated voltage to the logic circuit, and (b) during a second mode of operation of the logic circuit, allow the low power regulator to apply the second regulated voltage to the logic circuit and decouple the capacitor from the logic circuit while the low power regulator applies the second regulator voltage; and another low power regulator coupled to the supply voltage terminal and configured to apply a third regulated voltage across the capacitor, wherein the third regulated voltage is selected to compensate for leakages of the capacitor, the main voltage regulator, and a bypass switch between an output of the main voltage regulator and the logic circuit, wherein:
  to allow the main voltage regulator to apply the first regulated voltage to the logic circuit, the control circuit is configured to disable the low power regulator and to close the bypass switch between the output of the main voltage regulator and the logic circuit, and
  to allow the low power regulator to apply the second regulated voltage to the logic circuit, the control circuit is configured to enable the low power regulator and to open the bypass switch between the output of the main voltage regulator and the logic circuit.

2. The electronic circuit of claim 1, wherein the logic circuit comprises a memory.

3. The electronic circuit of claim 2, wherein the memory and the control circuit are part of a System-on-Chip (SoC).

4. The electronic circuit of claim 2, wherein the first mode of operation comprises an active mode, and wherein the second power mode of operation comprises a retention mode.

5. The electronic circuit of claim 1, wherein the main voltage regulator comprises a linear voltage regulator.

6. The electronic circuit of claim 1, wherein the low power regulator comprises a Switched Capacitor Power Converter (SCPC).

7. The electronic circuit of claim 1, wherein the low power regulator comprises a DC-to-DC converter.

8. The electronic circuit of claim 1, wherein the low power regulator comprises a Low-Dropout (LDO) regulator.

9. The electronic circuit of claim 1, wherein an output of the low power regulator is in a high impedance state during the first mode of operation.

10. An electronic circuit, comprising:
  a main voltage regulator coupled to a supply voltage terminal and configured to apply a first regulated voltage across a capacitor coupled in parallel with a logic circuit;
  a low power regulator coupled to the supply voltage terminal and configured to apply a second regulated voltage across the logic circuit;
  a control circuit coupled to the low power regulator, wherein the control circuit is configured to: (a) during a first mode of operation of the logic circuit, allow the main voltage regulator to apply the first regulated voltage to the logic circuit, and (b) during a second mode of operation of the logic circuit, allow the low power regulator to apply the second regulated voltage to the logic circuit and decouple the capacitor from the logic circuit while the low power regulator applies the second regulator voltage; and
  another low power regulator coupled to the supply voltage terminal and configured to apply a third regulated voltage across another logic circuit, wherein the logic circuit and the another logic circuit are in different power domains, wherein:
    to allow the main voltage regulator to apply the first regulated voltage to the logic circuit, the control circuit is configured to disable the low power regulator and to close a bypass switch between an output of the main voltage regulator and the logic circuit, and
    to allow the low power regulator to apply the second regulated voltage to the logic circuit, the control circuit is configured to enable the low power regulator and to open the bypass switch between the output of the main voltage regulator and the logic circuit.

11. The electronic circuit of claim 10, further comprising:
another main voltage regulator coupled to an output of the main voltage regulator and to a second capacitor coupled in parallel with the logic circuit.

12. A method, comprising:
in connection with a memory entering a retention mode, enabling a switching regulator and opening a bypass switch, wherein the switching regulator receives a supply voltage coupled to a main regulator, wherein the main regulator applies a first regulated voltage across a capacitor coupled in parallel with the memory when the bypass switch is closed, wherein the capacitor is decoupled from the memory when the bypass switch is open, and wherein the switching regulator applies a second regulated voltage to the memory when the bypass switch is open; and
in connection with the memory leaving the retention mode, closing the bypass switch.

13. The method of claim 12, wherein the switching regulator comprises a Switched Capacitor Power Converter (SCPC).

14. The method of claim 12, further comprising maintaining an output of the switching regulator in a high impedance state after the memory leaves the retention mode.

15. An electronic device, comprising:
  a Power Management Integrated Circuit (PMIC) configured to apply a first regulated voltage to a first capacitor and a second regulated voltage to a second capacitor;
  a memory circuit coupled in parallel with the first capacitor via a first switch and to the second capacitor via a second switch; and
  a control circuit configured to: (a) close the first switch and open the second switch when the memory circuit operates in active mode; and (b) open the first switch and close the second switch when the memory circuit operates in retention mode.

16. The electronic device of claim 15, wherein the first capacitor and the first regulated voltage are larger than the second capacitor and the second regulated voltage.

17. The electronic device of claim 15, wherein the memory circuit and the control circuit are part of a System-on-Chip (SoC) coupled to the PMIC.

* * * * *